United States Patent [19]
Fukazawa

[11] Patent Number: 5,626,308
[45] Date of Patent: May 6, 1997

[54] WINDING METHOD AND APPARATUS FOR WOUND BALLS

[75] Inventor: Fumio Fukazawa, Chichibu, Japan

[73] Assignee: Bridgestone Sports Co., Ltd., Tokyo, Japan

[21] Appl. No.: 571,548

[22] Filed: Dec. 13, 1995

[30] Foreign Application Priority Data

Dec. 15, 1994 [JP] Japan .................................. 6-333477

[51] Int. Cl.$^6$ ...................................... B65H 54/64
[52] U.S. Cl. ...................................... 242/435.2
[58] Field of Search ................. 242/435, 435.1, 242/435.2

[56] References Cited

U.S. PATENT DOCUMENTS

| | | | |
|---|---|---|---|
| 2,153,408 | 4/1939 | Bogoslowsky | 242/435 |
| 3,871,158 | 3/1975 | Puleo | 242/435 |
| 4,846,910 | 7/1989 | Brown | 242/435 |
| 4,921,177 | 5/1990 | Blust | 242/435.2 |
| 5,007,594 | 4/1991 | Brown | 242/435.1 |
| 5,133,509 | 7/1992 | Brown | 242/435.1 |

FOREIGN PATENT DOCUMENTS

61-49985 10/1986 Japan .

*Primary Examiner*—Katherine Matecki
*Attorney, Agent, or Firm*—Sughrue, Mion, Zinn, Macpeak & Seas

[57] ABSTRACT

A core for a wound ball is produced by winding rubber thread (b) on a center to form a wound core, holding the wound core (a) between a pair of grasping fingers (21), placing a pair of wrapping rolls (31) at a distance from the wound core, wrapping a trailing section of rubber thread around the wrapping rolls (31) to form a loop (d) of rubber thread, contacting the wrapping rolls (31) in pressure with the peripheral surface of the wound core for securing a portion of the loop (d) to the wound core surface, removing the loop (d) from the wrapping rolls (31) and turning it down so as to extend along the wound core over the grasping fingers (21), causing a rubber thread holder (6) to abut the wound core through the turned-down loop for thereby holding the wound core with the rubber thread holder (6) and the wrapping rolls (31) and securing the loop (d) to the wound core surface, and withdrawing the grasping fingers (21) from between the loop and the wound core, obtaining the wound core (a) having the trailing end (c) of rubber thread fixedly bound to its surface. The winding method can firmly secure the trailing end to the center without a need for adhesive, and it can be fully automated.

9 Claims, 9 Drawing Sheets

WINDING METHOD AND APPARATUS FOR WOUND BALLS

BACKGROUND OF THE INVENTION

1. Field of the Invention

This invention generally relates to the manufacture of a wound ball, typically a wound golf ball comprising a core having rubber thread wound on a spherical center and a cover on the core. More particularly, this invention relates to a method and apparatus for winding rubber thread on the center to form the wound core.

2. Prior Art

In general, wound golf balls are manufactured by winding rubber thread around a center, which is either a liquid center in the form of a rubber bag filled with a liquid or paste or a solid center made of solid rubber, to form a wound core, and enclosing the core with a cover.

It is a common practice to wind rubber thread on a center by holding the center among a plurality of rotatable winding rollers, feeding rubber thread to the surface of the center, and driving at least one of the winding rollers for rotation to thereby winding the rubber thread around the center. After rubber thread is wound on the center by this method, a trailing end of rubber thread must be secured to the wound core. The following techniques are known and used for securing the trailing end to the wound core.

(1) The trailing end of rubber thread is placed on the surface of the wound core and adhesive is applied thereat to adhesively bond the trailing end to the wound core surface. See Japanese Patent Publication (JP-B) No. 49985/1986.

(2) A trailing section of rubber thread is wound two or three turns on the wound core such that the trailing end is interposed between the center surface and the turns of rubber thread, thereby binding the trailing end to the wound core.

These trailing end securing techniques, however, have the following problems. The adhesive technique (1) has the following problems. (i) After a droplet of the adhesive is applied, it is dried and cured over a certain time. (ii) Due to tackiness of the adhesive, foreign matter is likely to adhere thereto. (iii) The winding apparatus is contaminated with the adhesive and its maintenance becomes cumbersome. (iv) Application of adhesive is not effective in the case of a liquid center because the liquid center is frozen before winding of rubber thread. While the center is allowed to thaw at the end of winding, moisture condenses on the wound rubber to prevent the adhesive from performing well. (v) The adhesive is eventually left in the ball to alter its performance.

Technique (2) of binding rubber thread to the wound core is free of the problems associated with the adhesive, but is currently carried out by manual operation because of difficulty of automation. The manual binding operation is cumbersome and requires skill, contributing to an efficiency reduction in the manufacture of wound golf balls.

Referring to FIG. 12, technique (2) of binding rubber thread to the wound core is illustrated in more detail. The worker holds a wound core a with fingers (only one finger shown in FIG. 12A) and winds a trailing section of rubber thread a few turns on the wound core over the fingers as shown in FIG. 12A. At the end of this operation, the trailing end c of rubber thread is pressed with the finger as shown in FIG. 12B. The finger is then withdrawn from inside the rubber thread turns while pulling the trailing end c to come under the thread rubber turns as shown in FIG. 12C. As a result, the trailing end c is interposed or bound between the rubber thread turns and the wound core a as shown in FIG. 12D. In this way, the trailing end c of rubber thread is secured to the wound core a.

After the wound core is manually taken out of the winding apparatus, the above-mentioned cumbersome rubber thread binding operation is carried out while paying attention not to allow the already wound section of rubber thread to loosen. This operation is inefficient and the binding operation can be performed only by a skilled worker who has subtle fingers. It is very difficult for an automatic robot machine to perform the binding operation.

The prior art winding methods are not fully satisfactory with respect to efficient manufacture and quality reliability of products because many problems arise in securing the trailing end of rubber thread to the wound core. There is a desire to have a winding method which can solve the problems associated with the end of rubber thread winding and produce wound golf balls of quality in an efficient manner.

SUMMARY OF THE INVENTION

Therefore, an object of the invention is to provide a method for winding rubber thread on a center for producing a wound ball, which method ensures easy and tight securing of the trailing end of rubber thread to the wound core and enables full automation of the winding process without raising problems as found in the prior art.

Another object of the invention is to provide a winding apparatus capable of carrying out the rubber thread winding step in an automatic manner.

The present invention pertains to the manufacture of a wound ball comprising a wound core having thread rubber wound on a spherical center and a cover on the core.

In a first form, the present invention provides a method for winding rubber thread on the center to form the wound core, comprising the steps of:

continuously feeding rubber thread to the center and rotating the center, thereby winding the rubber thread on the center to form a wound core, with a trailing section of rubber thread extending from the wound core, clamping the wound core with a pair of grasping fingers such that the core is held between the fingers, placing a pair of spaced apart parallel wrapping rolls at a predetermined distance from the wound core, wrapping the trailing section of rubber thread around the wrapping rolls to form a loop of rubber thread, bringing the wrapping rolls in pressure contact with the peripheral surface of the wound core for interposing a portion of the loop between the wrapping rolls and the wound core surface, thereby securing the portion of the loop, removing the loop from the wrapping rolls and turning down it toward the opposite side of the wound core so as to extend along the wound core over the grasping fingers, causing a rubber thread holder to abut under pressure the wound core through the turned-down loop on the side remote from the wrapping rolls for thereby holding the wound core with the rubber thread holder and the wrapping rolls and securing the loop to the wound core surface, in this state, withdrawing the grasping fingers from between the loop and the wound core surface, and taking the wound core from among the wrapping rolls and the rubber thread holder.

In a second form, the present invention provides an apparatus for winding thread rubber on the center to form the wound core, comprising

- a winding means including a plurality of winding rollers which are supported for motion toward and away from each other and for rotation about their axis, the winding means being operable to hold a center among the winding rollers, feed rubber thread to the center, and drive at least one of the winding rollers for rotation for rotating the center for thereby winding the rubber thread on the center to form a wound core, with a trailing section of rubber thread extending from the wound core,
- a core hand including a pair of grasping fingers for clamping the wound core,
- a loop roll unit including a pair of spaced apart parallel wrapping rolls,
- a wrapping hand for gripping the trailing section of rubber thread and wrapping the trailing section around the wrapping rolls to form a loop of rubber thread,
- a loop hand including a pair of rubber thread chucks adapted to move toward and away from each other, for removing the loop from the wrapping rolls and turning down it toward the opposite side of the wound core so as to extend along the wound core, and
- a rubber thread holder located opposite to the wrapping roll for pressing the loop on the wound core for securement.

Figure 11A:
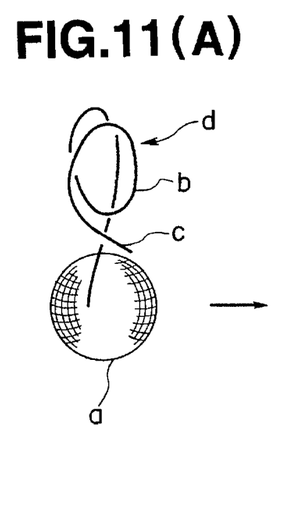
FIGS. 11(A), 11(B), and 11(C) schematically illustrate the principle of the winding method of the invention in the order of FIGS. 11(A), 11(B) and 11(C).

According to the winding method of the invention, after rubber thread is wound on a center to form a wound core, the wound core is clamped with a pair of grasping fingers such that the core is held between the fingers. A pair of spaced apart parallel wrapping rolls are placed at a predetermined distance from the wound core. The trailing section of rubber thread is wrapped around the wrapping rolls to form a loop of rubber thread. As shown in FIG. 11A, a loop $d$ of rubber thread $b$ is formed above the wound core $a$.

Figure 11B:
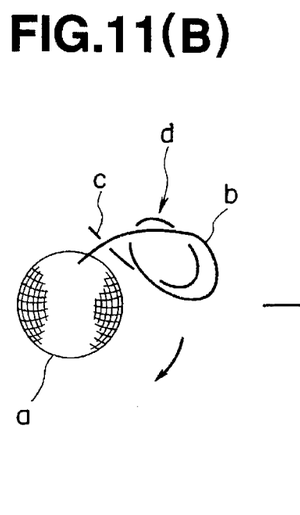
Figure 11C:
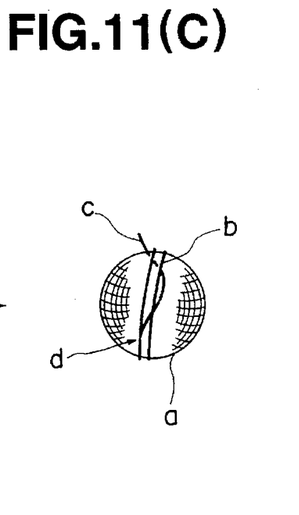
Figure 12A:
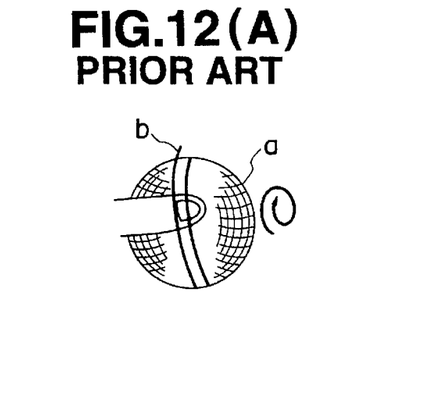
FIGS. 12(A), 12(B), 12(C), and 12(D) schematically illustrate how to secure a trailing end of rubber thread at the end of winding according to a prior art winding method, FIGS. 12(A), 12(B) and 12(C) illustrating successive securing steps and FIG. 12(D) being an enlarged view of the trailing end secured thereby.
Figure 12B:
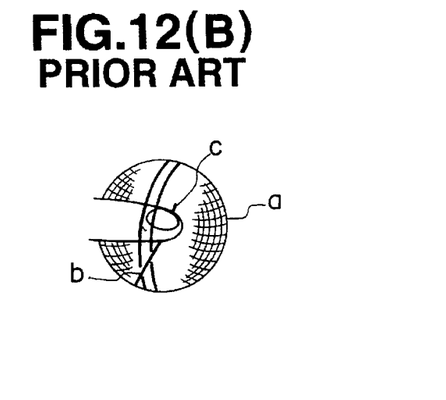
Figure 12C:
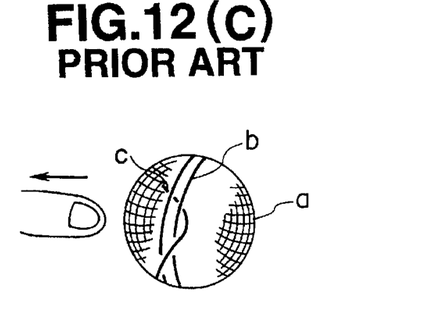
Figure 12D:
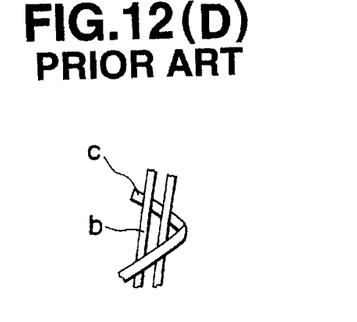

Next, the wrapping rolls are brought in pressure contact with the peripheral surface of the wound core for interposing a portion of the loop between the wrapping rolls and the wound core surface, thereby securing the portion of the loop. The loop is removed from the wrapping rolls and turned down toward the opposite side of the wound core to extend along the wound core over the grasping fingers. In this way, the loop $d$ formed above the wound core $a$ is turned down about the trailing end $c$ of rubber thread $b$ as shown in FIG. 11B. The loop $d$ is now wrapped around the wound core $a$ as shown in FIG. 11C. At this point, the loop $d0$ is turned down to the side where the trailing end $c$ of rubber thread $b$ crossing its emerging end extends as shown in FIG. 11B. The trailing end $c$ is bound or caught between the peripheral surface of the wound core $a$ and the loop $d$ now wrapped around the wound core $a$ as shown in FIG. 11C.

Next, a rubber thread holder is abutted under pressure against the wound core through the turned-down loop on the side remote from the wrapping rolls whereby the wound core is held with the rubber thread holder and the wrapping rolls and the loop is secured to the wound core surface. In this state, the grasping fingers are withdrawn from between the loop and the wound core surface. The wound core is removed from between the wrapping rolls and the rubber thread holder. The wound core having the trailing end of rubber thread fixedly bound is therefore recovered. Even when the grasping fingers are withdrawn from between the wound core and the loop of rubber thread wrapped therearound, the loop of rubber thread is not separated from the periphery of the wound core together with the grasping fingers. The loop of rubber thread is kept secured on the periphery of the wound core since the loop of rubber thread is tightly clamped to the periphery of the wound core by the wrapping rolls and rubber thread holder.

The winding method according to the invention enables securing the trailing end of rubber thread to the wound core without a need for adhesive. This achieves a brief attachment of the thread trailing end to the wound core and eliminates the detrimental influence of adhesive on the winding apparatus. Binding of the thread trailing end to the wound core can be accomplished by the simple steps of wrapping the trailing section of rubber thread around a pair of wrapping rolls to form a loop and turning down the loop to extend around the wound core. That is, the trailing end of rubber thread can be fixedly bound to the wound core within a short time without a cumbersome operation. Since the winding apparatus includes the winding means for winding rubber thread on a center to form a wound core, the core hand having grasping fingers for taking out and holding the wound core from the winding means, the loop roll unit having a pair of wrapping rolls, the wrapping hand for wrapping the trailing section of rubber thread around the wrapping rolls to form a loop of rubber thread, and the loop hand for turning down the loop of rubber thread to extend around the wound core so as to bind the trailing end under the loop wherein all the components are operated in unison by an automatic control, the operation of fixedly binding the trailing end of rubber thread at the end of winding can be fully automated.

The winding apparatus of the invention includes the core hand, loop roll unit, wrapping hand, and loop hand as mentioned above, and carries out the step of winding rubber thread on a center and the step of securing the trailing end of rubber thread to the wound core in an automatic manner according to the method of the invention. The apparatus is operated to produce a wound core by supporting a center among winding rollers, continuously feeding rubber thread to the center and driving one of the winding rollers to rotate the center, thereby winding the rubber thread on the center to form a wound core, with a trailing section of rubber thread extending from the wound core; clamping the wound core with grasping fingers of the core hand, removing the wound core from among the winding rollers; placing the wound core at a predetermined distance from wrapping rolls of the loop roll unit; gripping the trailing end of rubber thread with the wrapping hand and wrapping the trailing section of rubber thread around the wrapping rolls to form a loop of rubber thread; bringing the wrapping rolls in pressure contact with the wound core; gripping the loop with the loop hand and turning down the loop to extend along the wound core; causing a rubber thread holder to abut the wound core through the turned-down loop on the side remote from the wrapping rolls for thereby holding the wound core with the rubber thread holder and the wrapping rolls and securing the loop to the wound core surface; in this state, withdrawing the grasping fingers from between the loop and the wound core surface; and removing the wound core from between the wrapping rolls and the rubber thread holder.

In this way, the winding apparatus of the invention carries out the rubber thread winding step and the trailing end securing step in an automatic manner according to the winding method of the invention.

BRIEF DESCRIPTION OF THE DRAWINGS

These and further features of the present invention will be apparent with reference to the following description and drawings, wherein.

DETAILED DESCRIPTION OF THE INVENTION

Figure 1:
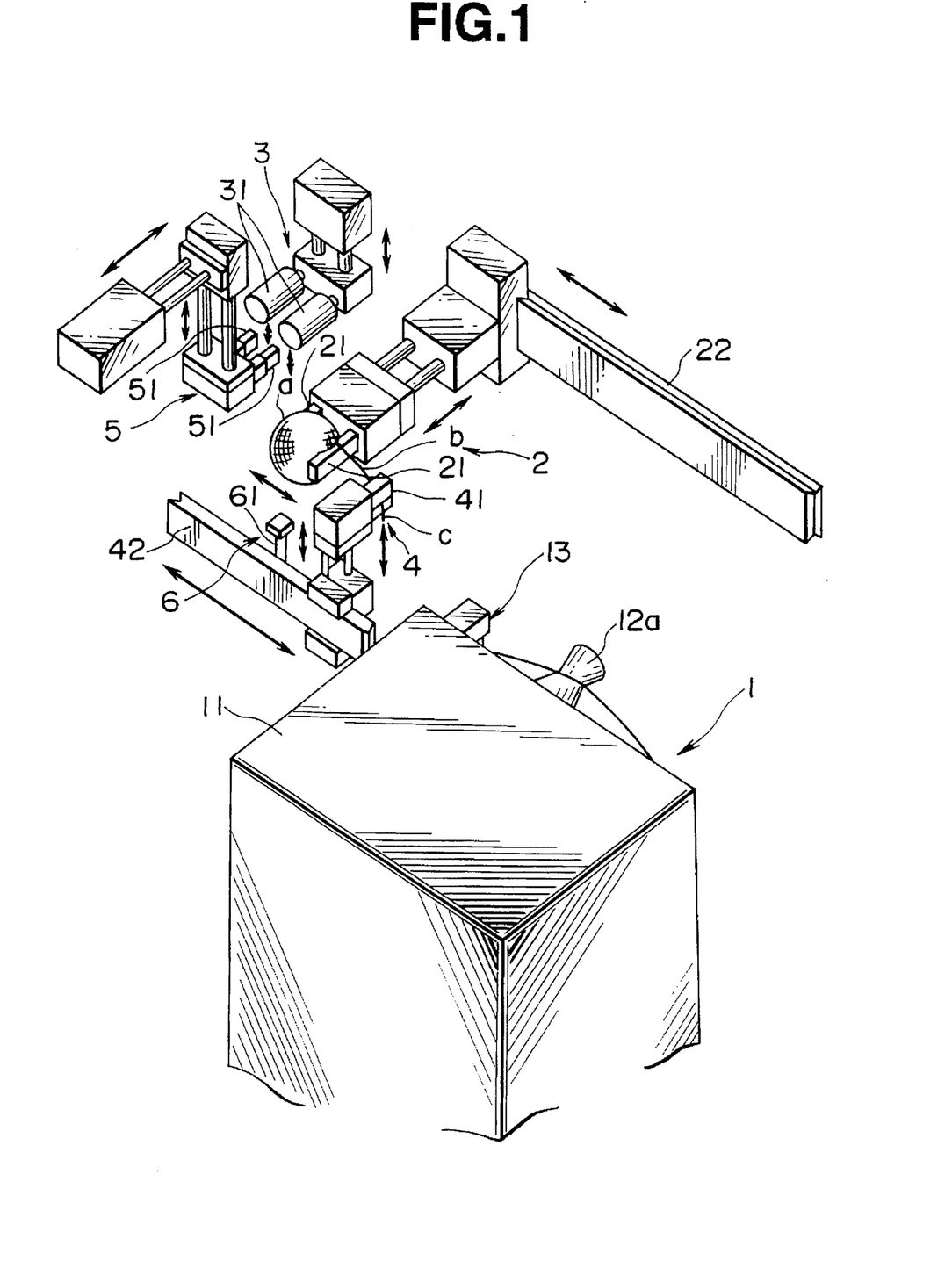
FIG. 1 is a schematic perspective view of a winding apparatus according to one embodiment of the invention.
Figure 2:
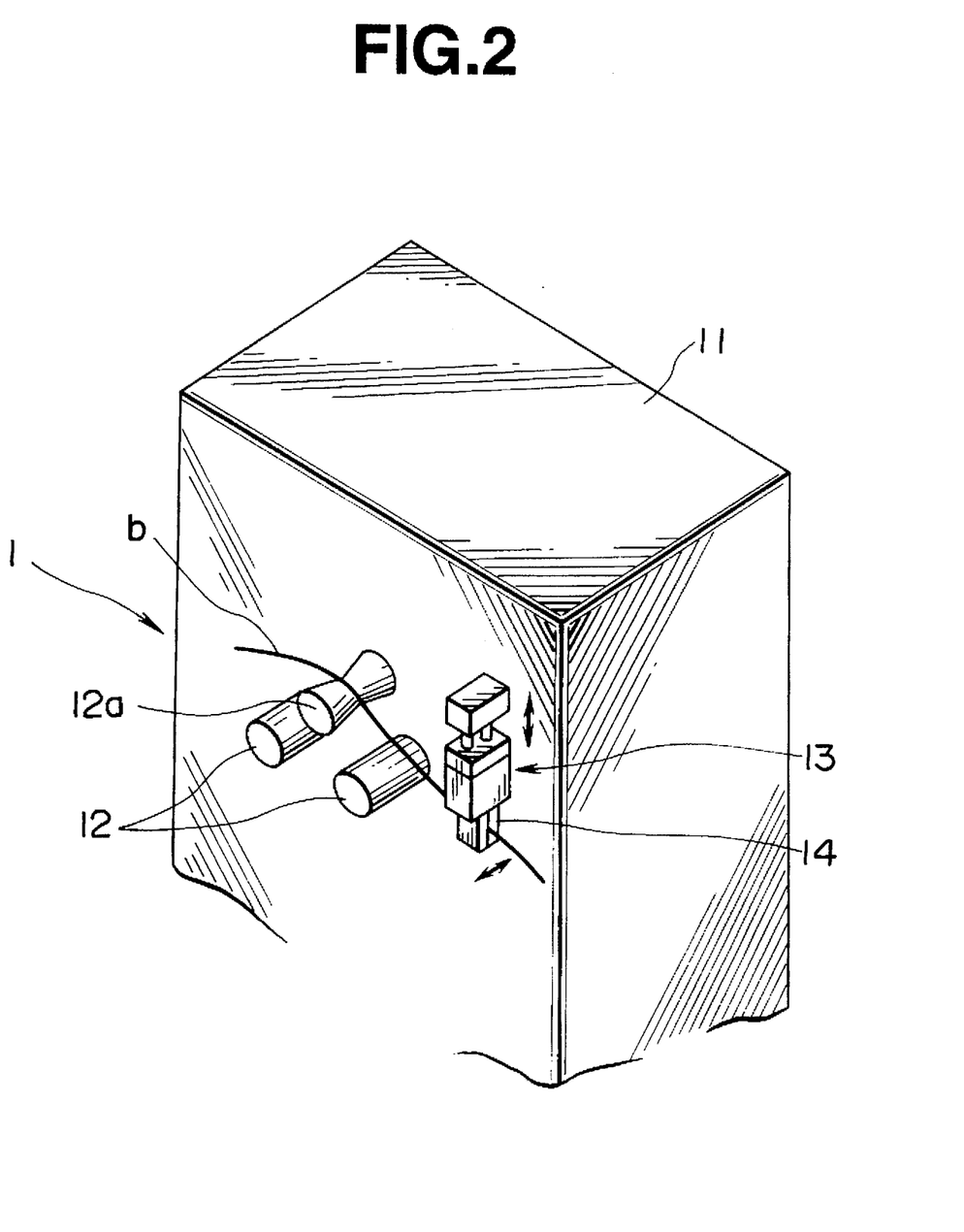
FIG. 2 is a schematic perspective view of the winding means.

Referring to FIGS. 1 and 2, there is schematically illustrated a winding apparatus according to one embodiment of the invention. The winding apparatus includes a winding means 1, a core hand 2, a loop roll unit 3, a wrapping hand 4, a loop hand 5, and a rubber thread holder 6 and operates to produce a wound core for a wound golf ball according to the winding method of the invention.

As shown in FIG. 2, the winding means 1 includes a main frame 11 having a drive mechanism and a control mechanism (not shown) received therein, two cylindrical winding rollers 12, 12 and an hourglass winding roller 12a. The rollers 12, 12, 12a are arranged at the apexes of a triangle on a front side of the main frame 11 and are rotatably supported on drive shafts. The hourglass winding roller 12a which is tapered toward the axial center from opposite ends is disposed vertically above the horizontally arranged rollers 12. Under the control of the drive and control mechanisms in the frame 11, the cylindrical winding rollers 12, 12 can be driven for rotation about their axes and moved back and forth along their axes whereby the center is rotated in a continuously varying direction so that thread rubber may be uniformly wound on the center. The hourglass roller 12a is vertically movable toward and away from the cylindrical winding rollers 12, 12 so that the center or wound core may be loaded between or unloaded from the winding rollers. The hourglass roller 12a is gradually moved upward as the wound core increases its diameter during thread rubber winding.

A rubber thread hand 13 is mounted for vertical motion on an upper portion of the front side of the frame 11. The rubber thread hand 13 is disposed lateral to the upper winding roller 12a and includes a chuck 14 having a pair of beaks adapted to be opened and closed.

As shown in FIG. 1, the core hand 2 includes a pair of spaced apart grasping fingers which are supported in parallel and automatically controlled to move toward and away from each other. The core hand 2 is mounted on a guide rail 22 for lateral motion so that the core hand 2 may be moved to a position opposed to the winding rollers 12, 12, 12a of the winding means 1. The core hand 2 also includes a plunger so that the core hand 2 may be moved toward and away from the winding means 1.

The loop roll unit 3 includes a pair of spaced apart wrapping rolls 31, 31 which are supported in parallel. The loop roll unit 3 is disposed on one side of the winding means 1 and adapted to move vertically up and down.

The wrapping hand 4 includes a chuck 41 having a pair of beaks which are automatically controlled to open and close. The wrapping hand 4 is disposed on one side of the winding means 1 and generally opposed to the core hand 2. The wrapping hand 4 is mounted on a guide rail 42 for lateral motion. The wrapping hand 4 includes an automatically controlled plunger so that the wrapping hand 4 may be moved vertically up and down. By automatic control, the wrapping hand 4 together with the guide rail 42 is moved back and forth relative to the core hand 2.

The loop hand 5 includes a pair of spaced apart rubber thread chucks 51, 51 which are supported in parallel and automatically controlled to move toward and away from each other. The loop hand 5 is disposed on one side of the winding means 1 and opposed to the loop roll unit 3. The loop hand 5 is automatically controlled to move up and down in a vertical direction and toward and away from the loop roll unit 3. The chucks 51 are also automatically controlled for opening and closing operation.

The rubber thread holder 6 is a rectangular block having a spherical concave upper surface. The rubber thread holder 6 is disposed on one side of the winding means 1 and below the rubber core hand 2 and supported for vertical motion by an automatically controlled piston bar 61.

Figure 5A:
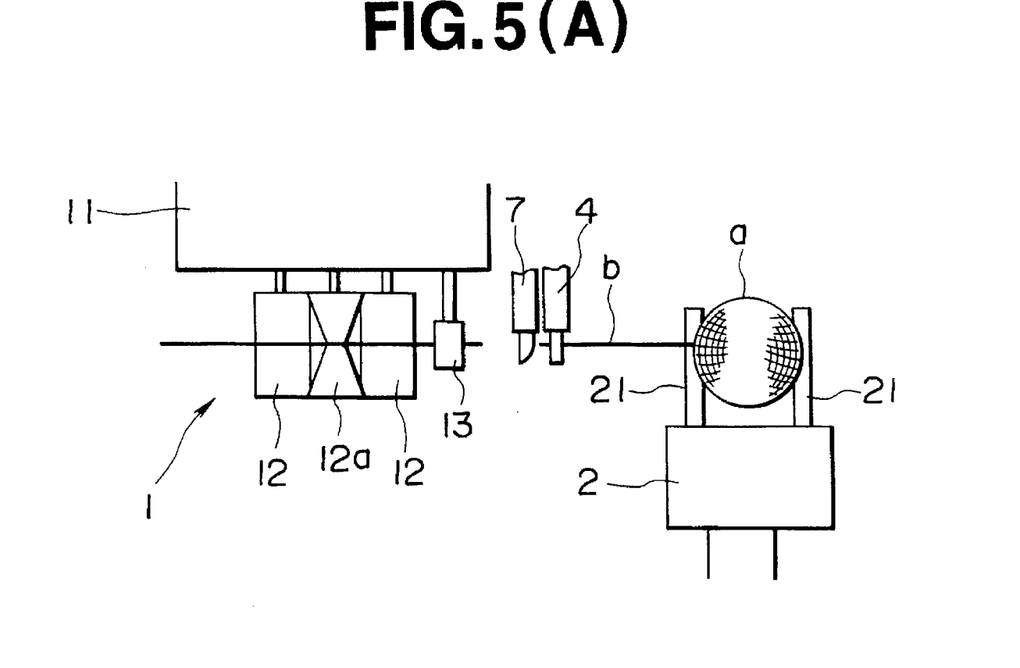
FIGS. 5(A), and 5(B) schematically illustrate the third step of the winding method of the invention, FIG. 5(A) being a plan view and FIG. 5(B) being a front elevation.
Figure 5B:
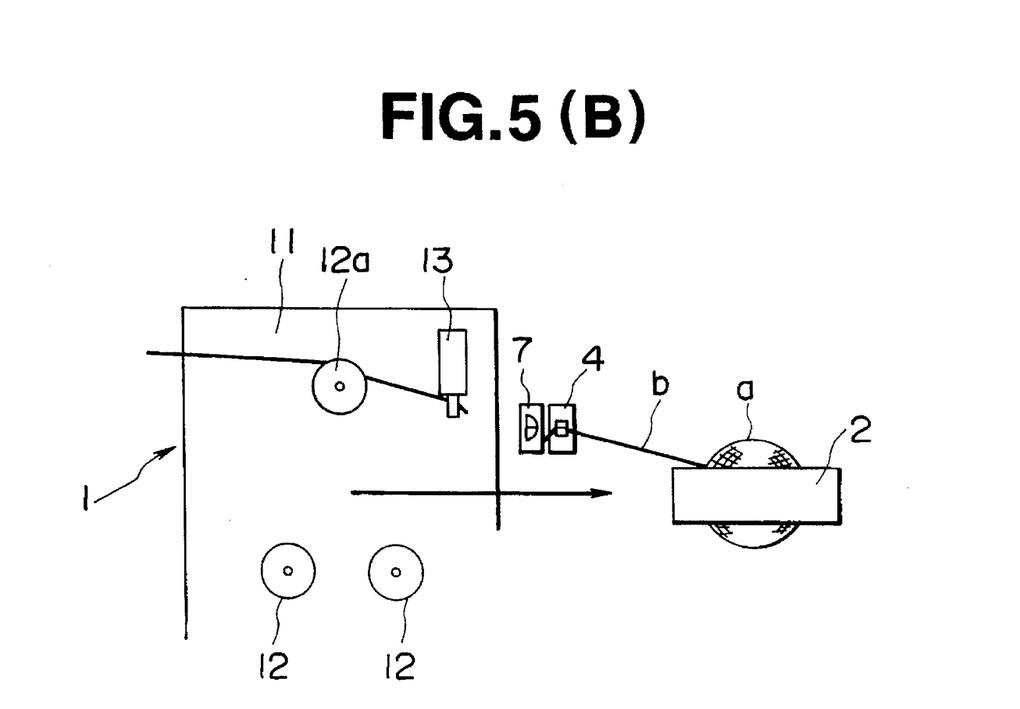

Though not shown in FIGS. 1 and 2, and air nipper 7 for cutting rubber thread is disposed between the rubber thread hand 13 of the winding means 1 and the wrapping hand 4 in a retractable manner (see FIG. 5).

Next, the operation of the winding apparatus is described. It is noted that all the above-mentioned components are operated in unison by an automatic control system.

Figure 3A:
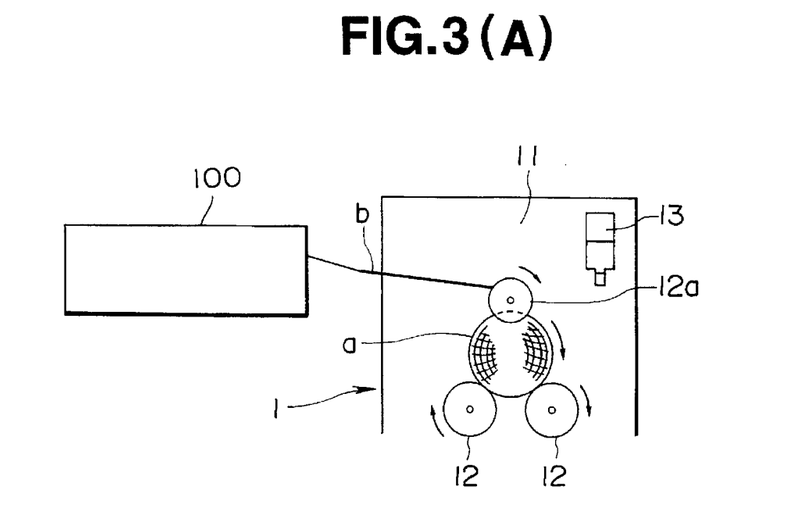
FIGS. 3(A), 3(B), and 3(C) schematically illustrate the first step of winding rubber thread on a center to form a wound core according to the winding method of the invention, FIG. 3(A) being a front elevation, FIG. 3(B) being a plan view, and FIG. 3(C) being a side elevation of the winding means.
Figure 3B:
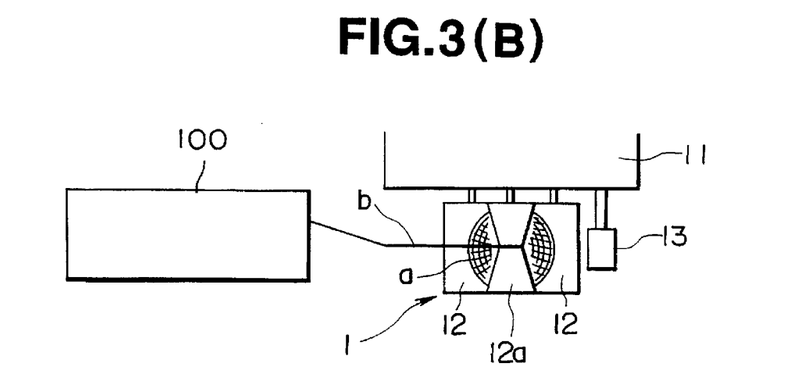
Figure 3C:
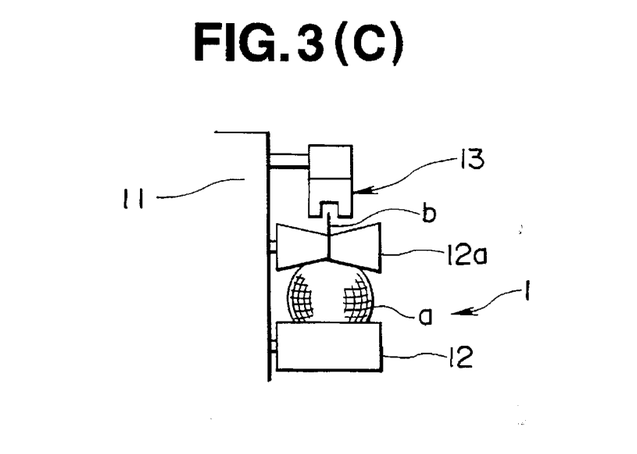

A rubber thread is wound on a center to form a (wound) core for a wound golf ball by means of the winding apparatus. First, a center is supported among the winding rollers 12, 12, 12a of the winding means as shown in FIG. 3. While a rubber thread b is continuously fed from a rubber thread supply 100 to the center, the winding rollers 12, 12 are driven for rotation to turn round the center for winding the rubber thread b on the center to form a wound core a. The thread winding technique used herein may be any of well-known winding techniques including random winding and great circle winding techniques. Thread winding can be carried out by driving and controlling the winding rollers 12, 12, 12a in a well-known manner.

Figure 4A:
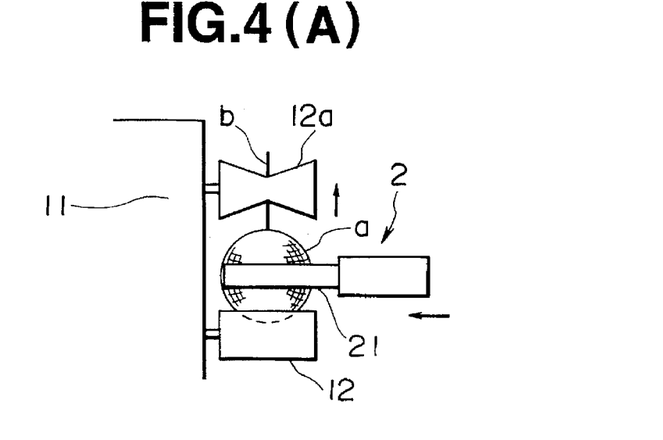
FIGS. 4(A), 4(B), and 4(C) schematically illustrate the second step of the winding method of the invention, FIG. 4(A) being a side elevation, FIG. 4(B) being a front elevation, and FIG. 4(C) being a plan view of the winding means.
Figure 4B:
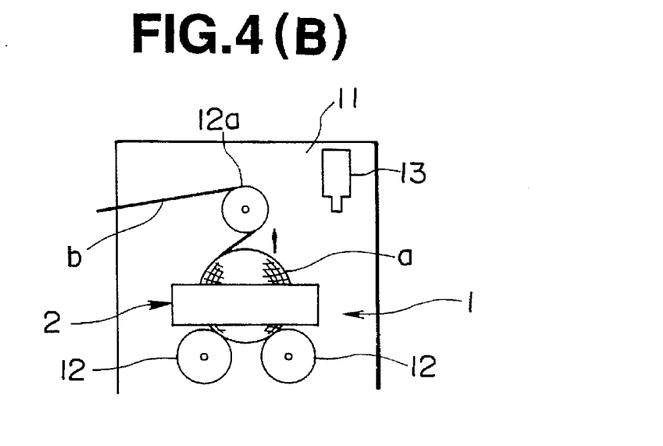
Figure 4C:
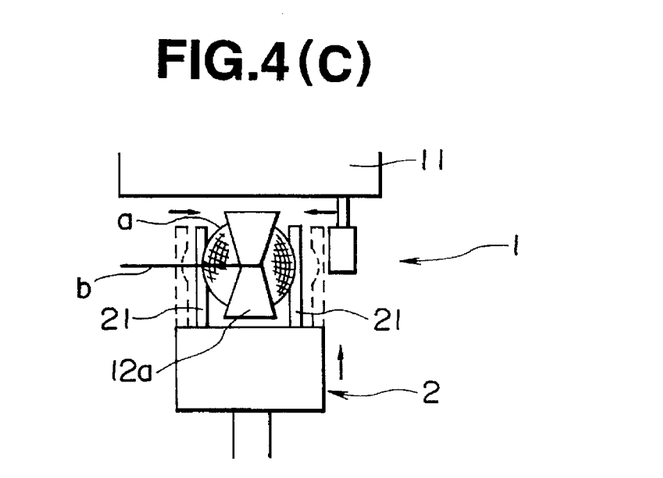

Next, the core hand 2 is mowed to the operative position among the winding rollers 12, 12, 12a as shown in FIG. 4 whereupon the wound core a is grasped with the pair of grasping fingers 21, 21. The winding roller 12a is moved upward. The wound core a is held between the grasping fingers 21, 21 in this way. Thereafter, the core hand 2 is laterally moved to one side to remove the wound core a aside from the position surrounded by the winding rollers 12, 12, 12a as shown in FIG. 5. At this point, as shown in FIG. 5, the rubber thread hand 13 captures the trailing section of rubber thread b and also, the wrapping hand 4 is advanced to capture the trailing section of rubber thread b. Thereafter, the air nipper 7 is advanced to cut the trailing section of rubber thread b between the rubber thread hand 13 and the wrapping hand 4.

Figure 6A:
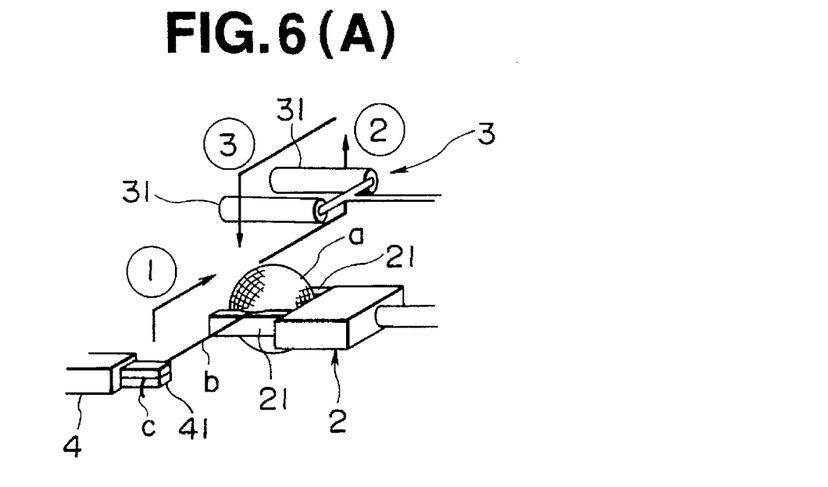
FIGS. 6(A), 6(B), and 6(C) schematically illustrate the fourth step of the winding method of the invention in the order of FIGS. 6(A), 6(B) and 6(C), FIGS. 6(A) and 6(B) being perspective views and FIG. 6(C) being a side elevation.
Figure 6B:
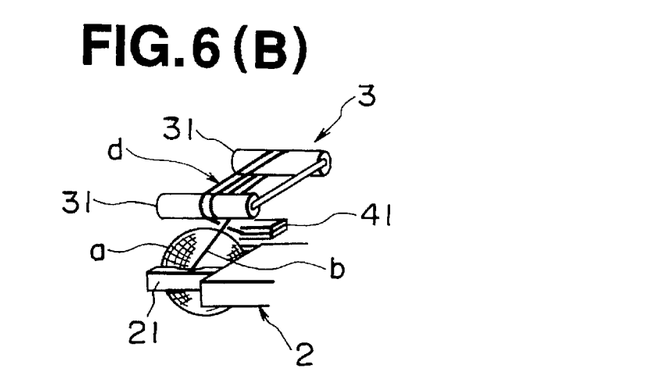
Figure 6C:
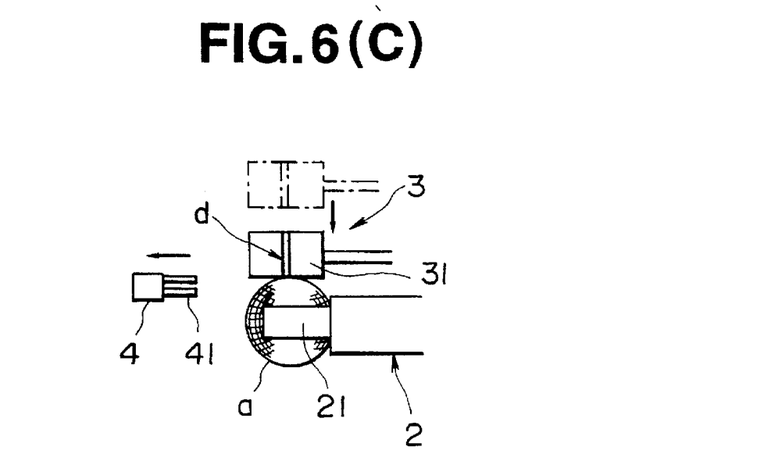

The wound core a held between the grasping fingers 21, 21 of the core hand 2 is carried to below the loop roll unit 3 together with the trailing end c of rubber thread captured by the wrapping hand 4 as shown in FIG. 6. That is, the core hand 2 and the wrapping hand 4 are moved in unison. The wound core a is located below the loop roll unit 3 and spaced a predetermined distance from the wrapping rolls 31, 31. While the trailing end c of rubber thread b is kept captured by the wrapping hand 4, the wrapping hand 4 is moved in the order of arrows 1, 2, and 3 (circled) in FIG. 6A and turned several turns around the wrapping rolls 31, 31. Then as shown in FIG. 6B, the rubber thread b is wrapped several turns (two turns in the illustrated embodiment) around the wrapping rolls 31, 31 to form loops d of the rubber thread b. Thereafter, the loop roll unit 3 is moved downward until the wrapping rolls 31, 31 come in pressure contact with the peripheral surface of the wound core a as shown in FIG. 6C. This results in a state where the loops d of rubber thread b are formed above the wound core a as shown in FIG. 11A and the loops d are partially urged and secured against the peripheral surface of the wound core a. Thereafter, the wrapping hand 4 is operated to open its chuck 41 to release the trailing end c of rubber thread b and is then retracted.

Figure 7A:
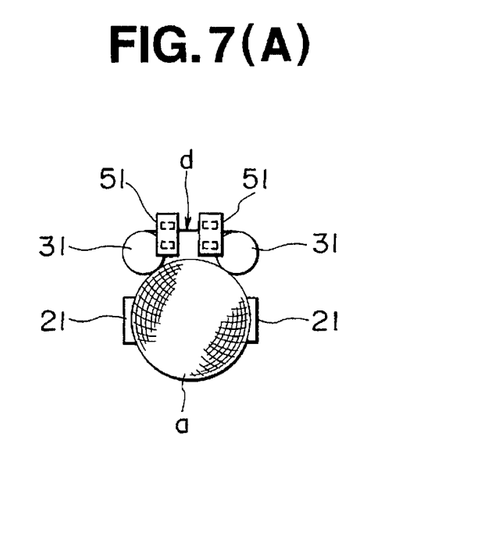
FIGS. 7(A) and 7(B) schematically illustrate the fifth step of the winding method of the invention, FIG. 7(A) being a front elevation and FIG. 7(B) being a side elevation.
Figure 7B:
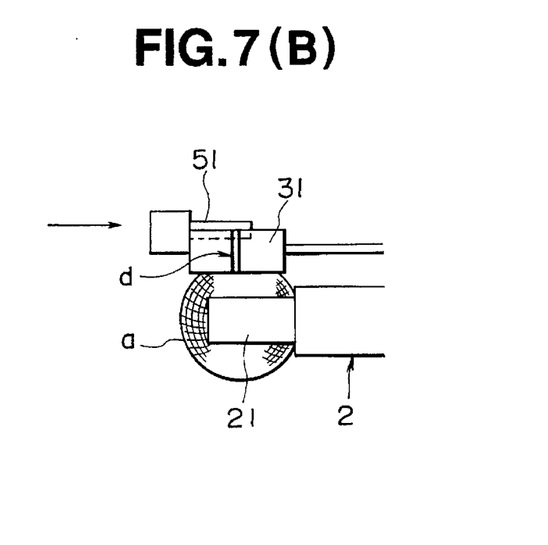
Figure 8A:
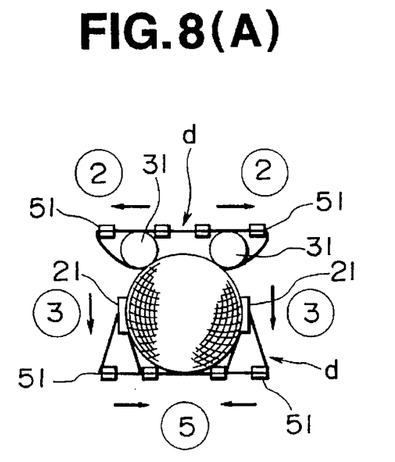
FIGS. 8(A) and 8(B) schematically illustrate the sixth step of the winding method of the invention, FIG. 8(A) being a front elevation and FIG. 8(B) being a side elevation.
Figure 8B:
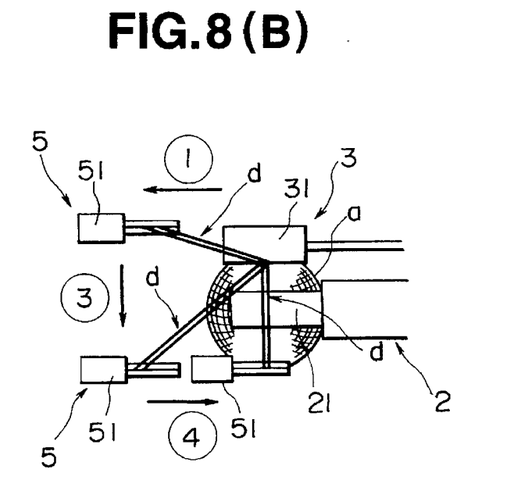

Next, the loop hand 5 is moved forward (toward the loop roll unit 3) until the chucks 51, 51 of the loop hand 5 are inserted between the wrapping rolls 31 and 31, and the upper portion of the loops d at spaced apart positions is clamped by the chucks 51, 51 as shown in FIGS. 7A and 7B. The loop hand 5 is then moved backward to disengage the loops d of rubber thread from the wrapping rolls 31, 31 as shown by an arrow 1 (circled) in FIGS. 8A and 8B. The rubber thread chucks 51, 51 are then moved away from each other to expand the loops d as shown by an arrow 2 (circled). In this state, the loop hand 5 is moved vertically downward as shown by an arrow 3 (circled) and then forward as shown by an arrow 4 (circled). Finally the rubber thread chucks 51, 51 are moved toward each other as shown by an arrow 5 (circled). In this way, the loops d are turned down with respect to their attachment to the peripheral surface of the wound core a by the wrapping rolls 31, 31. Consequently, the loops d are wrapped around the wound core a by extending them along the peripheral surface of the wound core a over the grasping fingers 21, 21 of the core hand 2.

As shown in FIG. 11B, the loops d are turned down to the side where the trailing end c of rubber thread b crossing its emerging end or apparent winding terminus extends (to the right side in FIG. 11A). The trailing end c is bound or caught between the peripheral surface of the wound core a and the loops d now wrapped around the wound core a as shown in FIG. 11C. At this point, the grasping fingers 21, 21 of the core hand 2 and the chucks 51, 51 of the loop hand 5 are interposed between the wound core a and the loops d of rubber thread b as seen from FIG. 8B.

Figure 9A:
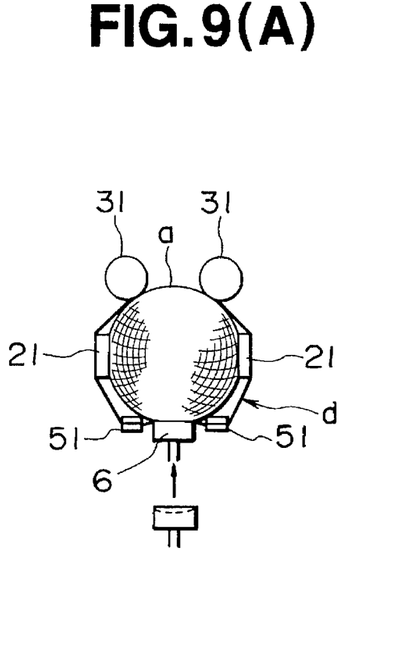
FIGS. 9(A) and 9(B) schematically illustrate the seventh step of the winding method of the invention, FIG. 9(A) being a front elevation and FIG. 9(B) being a side elevation.
Figure 9B:
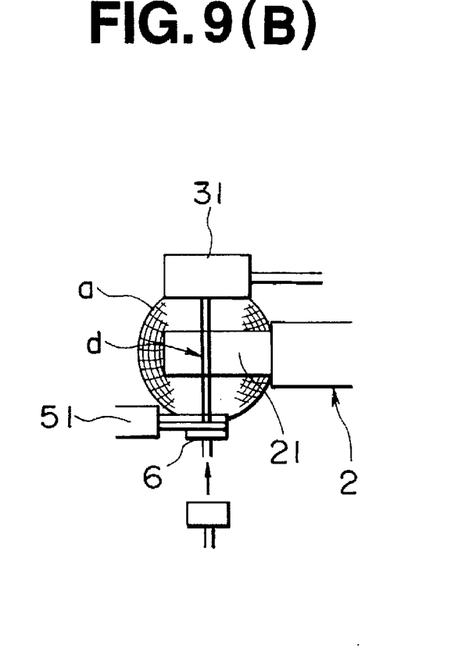
Figure 10:
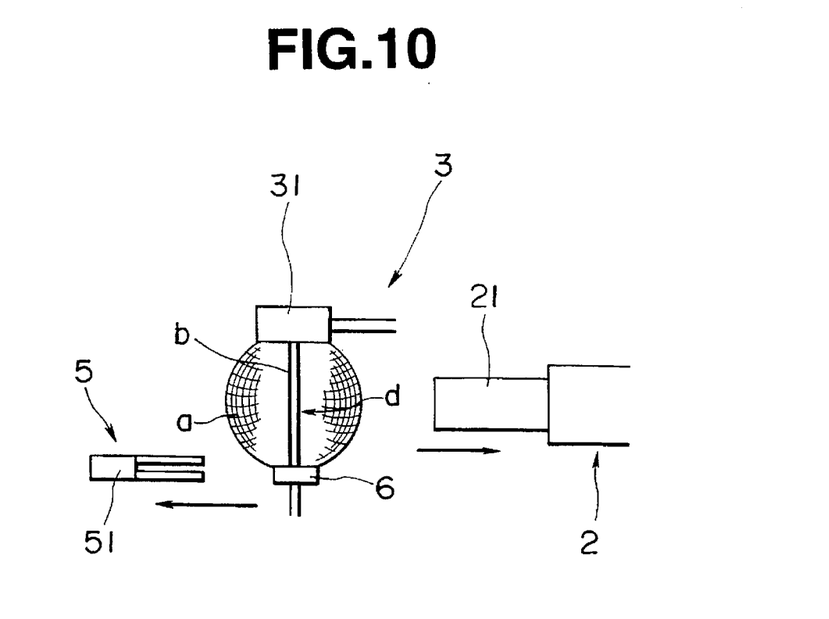
FIG. 10 schematically illustrates the eighth step of the winding method of the invention.

Thereafter, as shown in FIGS. 9A and 9B, the rubber thread holder 6 is moved upward until the rubber thread holder 6 abuts under pressure the wound core a through the loops d between the rubber thread chucks 51 and 51. The wound core a is supported by the rubber thread holder 6 and the wrapping rolls 31, 31, and the loops d are secured to the peripheral surface of the wound core a. In this state, the grasping fingers 21, 21 and the chucks 51, 51 are withdrawn from between the wound core a and the loops d of rubber thread b as shown in FIG 10. Thereafter the wound core a is removed from between the wrapping rolls 31, 31 and the rubber thread holder 6. There is collected the wound core a having the trailing end c of rubber thread fixedly bound. Even when the grasping fingers 21, 21 and the chucks 51, 51 of thread hand 5 are withdrawn from between the wound core a and the loops d of rubber thread b wrapped therearound, the loops d of rubber thread are not separated from the periphery of the wound core a together with the grasping fingers 21, 21 and the chucks 51, 51. The loops d of rubber thread are kept secured on the periphery of the wound core a since the loops d of rubber thread are tightly clamped to the periphery of the wound core by the wrapping rolls 31, 31 and rubber thread holder 6.

It will be understood that the wound core a is collected by, for example, moving the rubber thread holder 6 downward for allowing the wound core a to fall down. Alternatively, the wound core a is recovered by gripping the core a with a suitable pickup hand (not shown), moving the wrapping rolls 31, 31 upward and the rubber thread holder 6 downward, and retracting the pickup hand.

The winding method and apparatus according to the invention secures the trailing end c of rubber thread b to the wound core a without a need for adhesive. This achieves a brief attachment of the thread trailing end to the wound core and eliminates the detrimental influence of adhesive on the winding apparatus. Binding of the thread trailing end c to the wound core a can be accomplished by the simple steps of wrapping the trailing section of rubber thread b around a pair of wrapping rolls 31, 31 to form loops d and turning down the loops d to extend around the wound core a. That is, the trailing end c of rubber thread can be fixedly bound to the wound core a within a short time without cumbersome operation. Since the winding apparatus of the illustrated embodiment includes the winding means for winding rubber thread b on a center to form a wound core, the core hand 2 having grasping fingers 21 21 for taking out and holding the wound core from the winding means, the loop roll unit 3 having a pair of wrapping rolls 31, 31, the wrapping hand 4 for wrapping the trailing section of rubber thread around the wrapping rolls 31, 31 to form a loop of rubber thread, and the loop hand 5 for turning down the loop d of rubber thread to extend around the wound core a to bind the trailing end c under-the loop d wherein all the components are operated in unison by an automatic control, the operation of fixedly binding the trailing end of rubber thread at the end of winding can be fully automated.

The winding method and apparatus according to the invention are not limited to the illustrated embodiment. For example, although the step of wrapping the trailing section of rubber thread b around the wrapping rolls 31, 31 to form a loop d and the step of withdrawing the grasping fingers 21, 21 from between the rubber thread loops d and the periphery of the wound core a are automatically carried out by automatically controlling the wrapping hand 4 and the core hand 2 in the illustrated embodiment, these steps may be manually carried out. Even with manual operation, the trailing end of rubber thread b can be bound to the wound core a by a very simple operation as compared with the prior art, without a need for adhesive. Also the number of winding rollers 12 and the shape and control system of the wrapping hand 4 and loop hand 5 may be appropriately altered. With respect to the remaining members, modifications may be made without departing from the scope of the invention. Although the winding method and apparatus according to the invention are advantageously applicable to the manufacture of wound cores of wound golf balls, the invention can be equally applicable to other applications other than the wound golf balls as long as they are wound balls including a core having rubber thread wound on a center. For example, the invention is applicable to the manufacture of wound cores for baseballs.

There has been described a winding method which can secure the trailing end of rubber thread to the wound core without a need for adhesive. The securing step can be carried out by a simple procedure in an easy manner. The rubber thread winding operation can be fully automated without the problems raised in the prior art. The winding apparatus of the invention can automatically carry out the step of winding rubber thread and the step of securing the trailing end of rubber thread according to the winding method of the invention.

Although some preferred embodiments have been described, many modifications and variations may be made thereto in the light of the above teachings. It is therefore to be understood that within the scope of the appended claims, the invention may be practiced otherwise than as specifically described.

I claim:

1. A method for making a wound core for a wound ball having a wound core with a rubber thread wound on a spherical center and a cover on the core, comprising the steps of:

continuously feeding rubber thread to the spherical center and rotating the spherical center, thereby winding the rubber thread on the spherical center to form a wound core, clamping the wound core with a pair of grasping fingers such that the core is held between the fingers, placing a pair of spaced apart parallel wrapping rolls at a predetermined distance from the wound core, wrapping a trailing section of said rubber thread around the wrapping rolls to form a loop of rubber thread, bringing the wrapping rolls in pressure contact with the peripheral surface of the wound core for interposing a portion of the loop between the wrapping rolls and the wound core surface, thereby securing the portion of the loop, removing the loop from the wrapping rolls and turning it down toward the opposite side of the wound core so as to extend around the wound core over the grasping fingers, causing a rubber thread holder to abut under pressure the wound core through the turned-down loop on the opposite side of the wrapping rolls to the wound core with the rubber thread holder and the wrapping rolls and securing the loop to the wound core surface, in this state, withdrawing the grasping fingers from between the loop and the wound core surface, and taking the wound core from among the wrapping rolls and the rubber thread holder.

2. An apparatus for winding a rubber thread on a center to form a wound core for a ball, comprising:

winding means including a plurality of winding rollers which are supported for motion toward and away from each other and for rotation about their respective axes, said winding means being operable to hold a center among the winding rollers, to feed a rubber thread to the center, and to drive at least one of the winding rollers for rotation for rotating the center for thereby winding the rubber thread on the center to form a wound core, with a trailing section of rubber thread remaining and extending from the wound core, a core hand including a pair of grasping fingers for clamping the wound core, a loop roll unit including a pair of spaced apart parallel wrapping rolls, a wrapping hand for gripping said trailing section of rubber thread and wrapping said trailing section around the wrapping rolls to form a loop of rubber thread, a loop hand including a pair of rubber thread chucks adapted to move toward and away from each other, for removing the loop from the wrapping rolls and turning it down toward the opposite side of the wound core so as to extend along the wound core, and a rubber thread holder located opposite the wrapping roll for pressing the loop on the wound core for securement.

3. The apparatus of claim 2 wherein said winding means includes a rubber thread hand, an air nipper for cutting said thread rubber; said air nipper positioned between said wrapping hand and said rubber thread hand and moveable therebetween.

4. The apparatus of claim 3 wherein said rubber thread hand is mounted for vertical motion on said winding means and positioned laterally to one of said winding rollers.

5. The apparatus of claim 2 wherein said core hand is mounted on a guide member for lateral motion relative to said winding rollers.

6. The apparatus of claim 2 wherein said loop roll unit is positioned on one side of said winding means and adapted for vertical movement.

7. The apparatus of claim 2 wherein said wrapping hand comprises a chuck having a pair of clamp members and said wrapping hand positioned on a side of said winding means opposite said core hand.

8. The apparatus of claim 2 wherein said loop hand comprises a pair of spaced rubber thread chucks and said loop hand positioned on a side of said winding means opposite to said loop roll unit.

9. The apparatus of claim 2 wherein said rubber thread holder comprises a rectangular block having a spherical concave upper surface, said rubber thread holder positioned on a side of said winding means below said core hand.

* * * * *